July 19, 1960 B. A. McGUINNESS 2,945,603
VEHICLE-PARKING FACILITIES
Filed Feb. 27, 1957 2 Sheets-Sheet 1
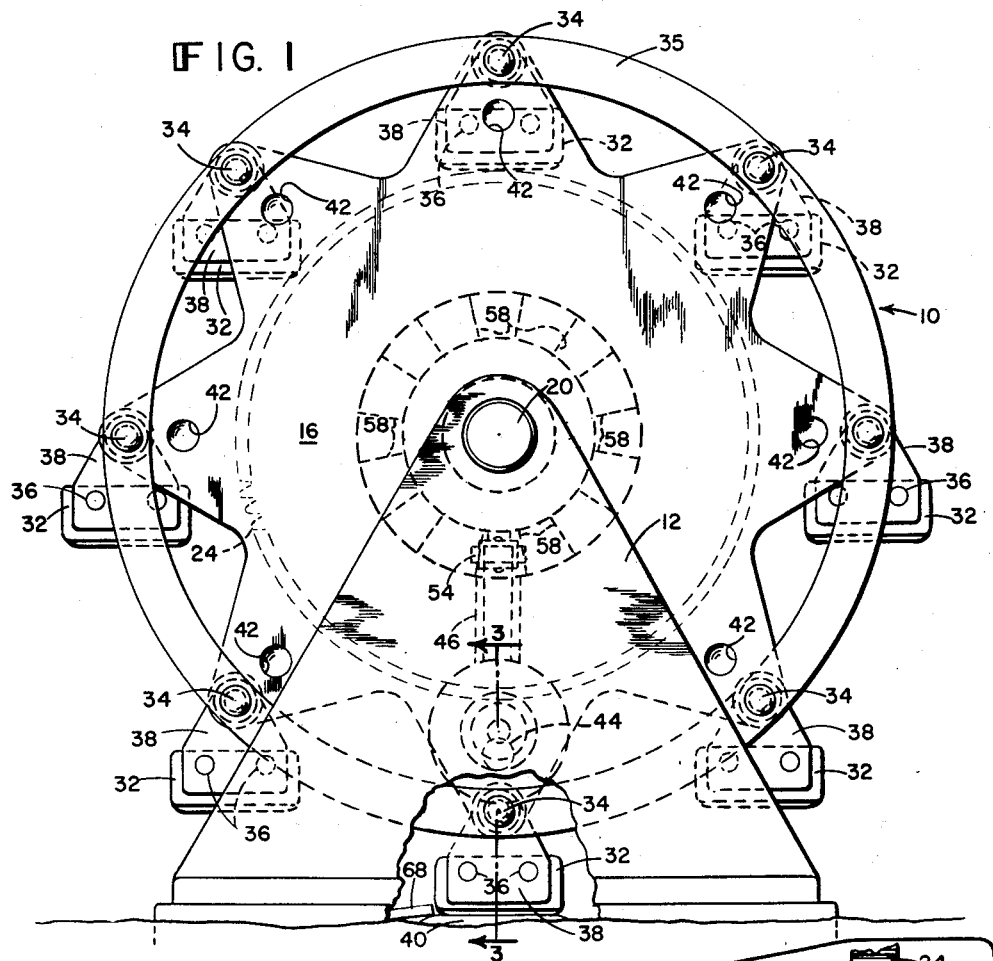
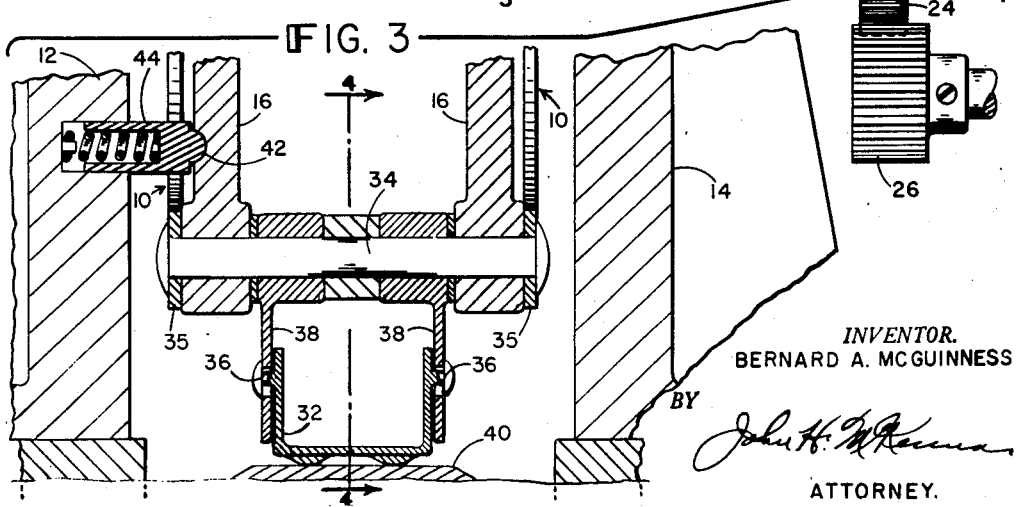
INVENTOR.
BERNARD A. MCGUINNESS
BY
ATTORNEY.

July 19, 1960 B. A. McGUINNESS 2,945,603
VEHICLE-PARKING FACILITIES
Filed Feb. 27, 1957 2 Sheets-Sheet 2
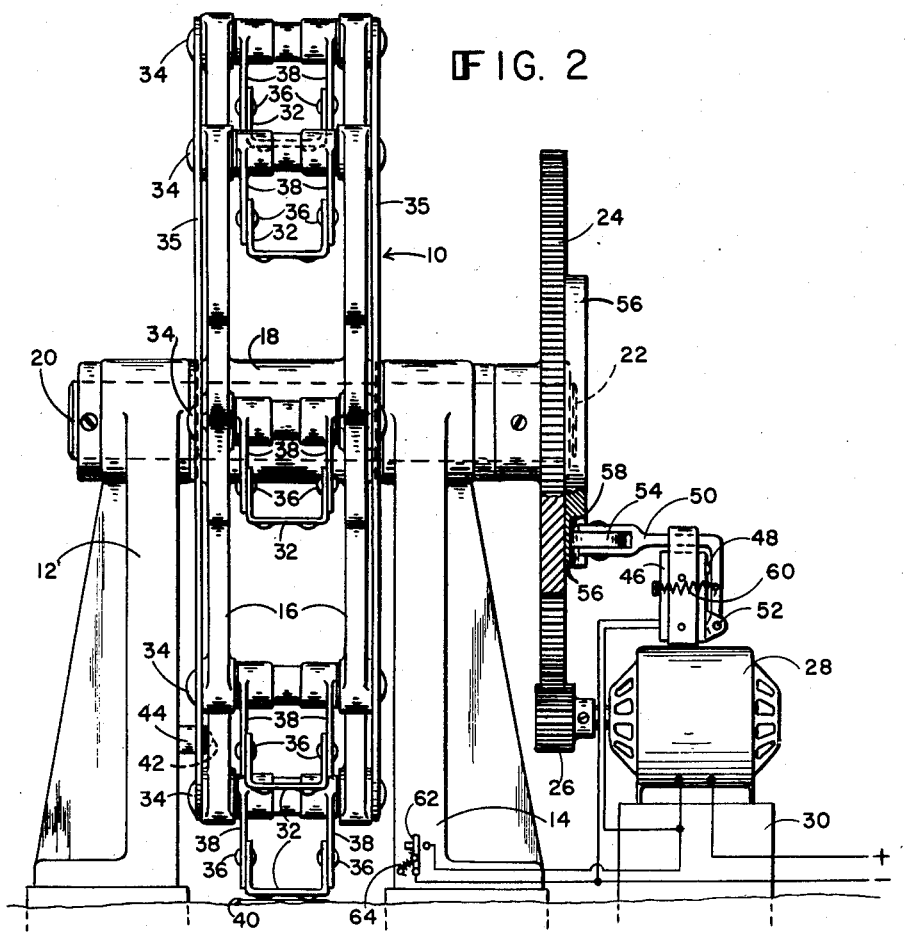
INVENTOR.
BERNARD A. MCGUINNESS
BY
ATTORNEY.

__United States Patent Office__

2,945,603
Patented July 19, 1960

2,945,603

VEHICLE-PARKING FACILITIES

Bernard A. McGuinness, 387 Harvard St., Cambridge, Mass.

Filed Feb. 27, 1957, Ser. No. 642,896

1 Claim. (Cl. 214—16.1)

This invention relates to improvements in vehicle-parking facilities. More particularly, the invention provides multiple-unit vehicle-parking apparatus wherein a multiplicity of vehicles, such as automobiles, for example, may be supported in individual hangers suspended from vertically disposed circulatory means and be movable in a circulatory path generally in a vertical plane.

Limited available space for the parking of automobiles, and comparable vehicles, is a major problem in practically every community, and in connection with practically every apartment dwelling, business establishment, and amusement center.

My present invention has for an object to substantially alleviate the general vehicle-parking problem by providing a vehicle-parking facility wherein a multiplicity of vehicles may be suspended in spaced relation on a relatively large wheel, or the like, which may be rotated about an horizontal axis to bring any particular vehicle, or vehicle suspension means, to a loading and unloading station.

Another object of the invention is to provide a vehicle-parking facility wherein a number of vehicles may be disposed in individual stalls or enclosures suitably suspended upon a carrier which is rotatable in a vertical plane about an horizontal axis.

Yet another object of the invention is to provide a vehicle-parking facility wherein a relatively large-diameter carrier wheel is rotatably supported in a vertical plane for rotation about an horizontal axis, and wherein individual vehicle stalls are suspended on the carrier at intervals around said horizontal axis, whereby the vehicle in any particular suspended stall may be moved to and from a loading and unloading station by rotating the said carrier.

A further object of the invention is to provide a vehicle-parking facility wherein vehicles may be suspended on a rotary carrier which is disposed generally in a horizontal plane for rotation about a horizontal axis, and wherein there is means for effecting rotation of said carrier to bring any particular vehicle to a loading and unloading position, and means for retaining the carrier against rotation while a vehicle is loading or unloading at said position.

It is, moreover, my purpose and object generally to improve the structure and efficiency of vehicle-parking facilities, and especially to utilize upper regions of space for accommodating vehicles for which parking space on the ground may be at a premium.

In the accompanying drawings:

Fig. 1 is a side elevational view of a vehicle-parking facility embodying features of the invention;

Fig. 2 is an end or edge view of the facility of Fig. 1, looking at the end or edge which is to the right in Fig. 1;

Fig. 3 is a fragmentary cross-sectional view on line 3—3 of Fig. 1, on a larger scale; and Fig. 4 is a cross-sectional view on line 4—4 of Fig. 3.

Referring to the drawings, a generally star-shaped wheel is represented generally at 10, rotatably mounted in the relatively rugged upstanding supports 12, 14, for rotation in a vertical plane about a horizontal axis. As represented, wheel 10 has two similar spaced star-shaped members 16, 16 which are rigidly secured together by the wheel hub 18, whose opposite end portions are reduced to provide the oppositely extending trunnions 20, 22. Trunnion 20 is journalled in the upper bearing portion of support 12, and trunnion 22 is journalled in the upper bearing portion of support 14, the trunnion 22 having extent outward beyond support 14 and having the relatively large gear 24 fixed thereon. Gear 24 is in mesh with a pinnion 26 on the shaft of electric motor 28 which may be mounted on a suitable support 30.

Wheel 10 has suspended thereon a number of generally U-shaped stalls or enclosures 32, each adapted to accommodate an automobile, or other vehicle. As herein represented, there are eight of the stalls or enclosures 32 suspended in spaced relation around the axis of the wheel 10, all of the stalls or enclosures being mounted and adapted to hang from the wheel with their bottom walls or floors tending, by gravity, to be always substantially in horizontal planes as the stalls or enclosures are carried around the axis of the wheel.

As best seen in Fig. 3, each stall or enclosure 32 is loosely suspended from a pivot shaft 34, of which there is one extending between the two wheel members 16, 16 at each of the eight locations of distributed suspension of the stalls or enclosures 32. Each stall or enclosure 32 may have pin-in-slot connection at 36 to brackets 38, 38 which are loose on the associated pivot shaft 34 so that, as a stall or enclosure 32 is moving to its lowermost position at the loading and unloading station, the stall may be cammed a little upward by a fixed platform 40 and come to rest at the said station supported entirely by the platform 40, as shown in Fig. 1.

Preferably, a pair of strengthening ring elements 35 are secured by the pivot shafts 34 to all of the points of star-shaped members 16, 16, one at the outer side of each member 16.

The outer surface of one of the star-shaped wheel members 16 has a depression 42 on the radial lines extending from the wheel axis to each of the pivot shafts 34, and a spring-backed retainer 44 is shown mounted on the support 12, constantly biased into engagement with the wheel member 16 having the said depressions. As the wheel rotates, retainer 44 snaps into each depression as a depression 42 comes opposite it, thereby tending to stop and hold the wheel stationary with a stall 32 on the platform 40 at the loading and unloading station. Obviously, any suitable retainer, or a number of retainers, may be employed to stop and hold the wheel at rest during loading and unloading.

Also, any suitable power means may be employed for rotating wheel 10, the illustrated electric motor drive being a convenient and efficient representative type of power means which may be effectively controlled by the illustrated switch means in the simple electrical circuit as shown somewhat diagrammatically in Fig. 2. A conventional variety of switch 46 is supported on motor 28 and has an actuating pin 48 biased outwardly to closed position. An actuating arm 50 is pivoted at 52 on the switch casing and has a wheel or roller 54 at its free end riding on a ring member 56 secured on gear 24 concentric about the axis of the gear. Ring member 56 is grooved at 58 on the radial line extending between the wheel axis and each pivot shaft 34, and the wheel or roller 54 on switch-actuating arm 50 is constantly biased by spring 60 toward ring member 56 whereby the wheel or roller rides into each groove 58 as the wheel 10 rotates. Hence, at each groove 58 the switch-actuating arm 50 opens switch 46 to de-energize motor 28 and to condition the apparatus for wheel 10 to be stopped by spring-backed member 44 each time that a stall or enclosure 32 is on platform 40 at the loading and unloading station. A manual switch 62 may be conveniently located for actuation by a person adjacent to the loading and unloading station, such as on the support 14 as shown in Fig. 2. Manual switch 62 may be in the motor circuit constantly biased by spring 64 to open position. However, the motor circuit may be closed by closing the manual switch 62 when the motor switch 46 is open thereby to start motor 28. If the manual switch is held closed, wheel 10 will rotate until switch 62 is opened regardless of the condition of motor switch 46. On the other hand, if manual switch 62 is closed only long enough to start wheel 10 rotating, the motor switch 46 then takes over control of the motor and is held closed during one eighth of a wheel rotation until wheel or roller 54 rides into a groove 58 to effect opening of switch 46.

The bottom or floor of each stall or enclosure 32 may be provided with the end shoulders 66 which tend to retain a vehicle against any appreciable accidental movement within a stall, it being assumed that the vehicle brakes will be applied by the operator before leaving the vehicle. However, under power, a vehicle may be readily driven over a said shoulder when the vehicle is entering or leaving a stall or enclosure 32. Obviously, hinged doors may be provided at one or both ends of a said stall or enclosure, or a retaining bar extend removably across each end thereof.

Any suitable movable ramp means 68 may be provided adjacent to the loading and unloading station to facilitate movement of a vehicle to and from a stall or enclosure 32 at the loading and unloading station. Such a ramp means, if desired, may be located at each end of the stall on support 40 although a single ramp means ordinarily will suffice.

It will be apparent from the foregoing description, in connection with the drawings, that a relatively large wheel 10, or other circulatory means, may carry any desired number of pivotally suspended vehicle stalls or enclosures 32 for parking vehicles in a parking facility, which will have substantial extent in a vertical plane, with provision for selectively bringing any particular stall or enclosure to a loading and unloading station by rotating the carrier wheel, or the like, about an horizontal axis.

Various changes may be made in details of the disclosed facility and in the mechanisms for driving and controlling the circuitous carrier within the scope of the appended claims, and it is intended that the patent shall cover, by suitable expression in the appended claim, whatever features of patentable novelty exist in the invention disclosed.

I claim as my invention:

A vehicle parking facility comprising a carrier wheel, said wheel having on a surface portion an annular series of recesses, means supporting the wheel for rotation in a generally vertical plane, vehicle receptacles pivotally suspended on said wheel, said receptacles distributed around said wheel in uniform relation to said recesses, each said receptacle being adapted to hang by gravity with its lower wall constantly maintained generally in a horizontal plane as the said receptacles are carried around said axis in response to rotation of said wheel, detent means carried by said supporting means and constantly biased into engagement with said surface portion and entering said recesses in succession in response to said rotation to maintain the carrier at rest whenever a said receptacle is in its lowermost position, a gear mounted for rotation with the wheel and having on an outer surface portion an annular series of depressions corresponding to said wheel surface recesses, a motor for driving said wheel and having a pinion meshing with said gear, and a normally closed switch controlling said motor and having an arm biased to engage said outer surface portion of said gear, said arm entering said depressions to open the switch and stop the motor each time a said receptacle reaches its lower-most position.

References Cited in the file of this patent

UNITED STATES PATENTS

| | | |
|---|---|---|
| 1,322,209 | Stevenson | Nov. 18, 1919 |
| 1,426,379 | Hadaway | Aug. 22, 1922 |
| 1,524,505 | Blue | Jan. 27, 1925 |
| 1,619,966 | Blackham et al. | Mar. 8, 1927 |
| 1,940,867 | James et al. | Dec. 26, 1933 |
| 2,242,891 | Light | May 20, 1941 |
| 2,427,190 | Bradley et al. | Sept. 9, 1947 |
| 2,486,128 | Davis | Oct. 25, 1949 |
| 2,670,860 | Cogings | Mar. 2, 1954 |
| 2,738,885 | Demaline | Mar. 20, 1956 |
| 2,792,105 | Wilson | May 14, 1957 |
| 2,817,446 | Hodous | Dec. 24, 1957 |